No. 752,071. PATENTED FEB. 16, 1904.
E. M. HERR.
FLUID PRESSURE BRAKE.
APPLICATION FILED MAY 12, 1902.
NO MODEL. 4 SHEETS—SHEET 1.
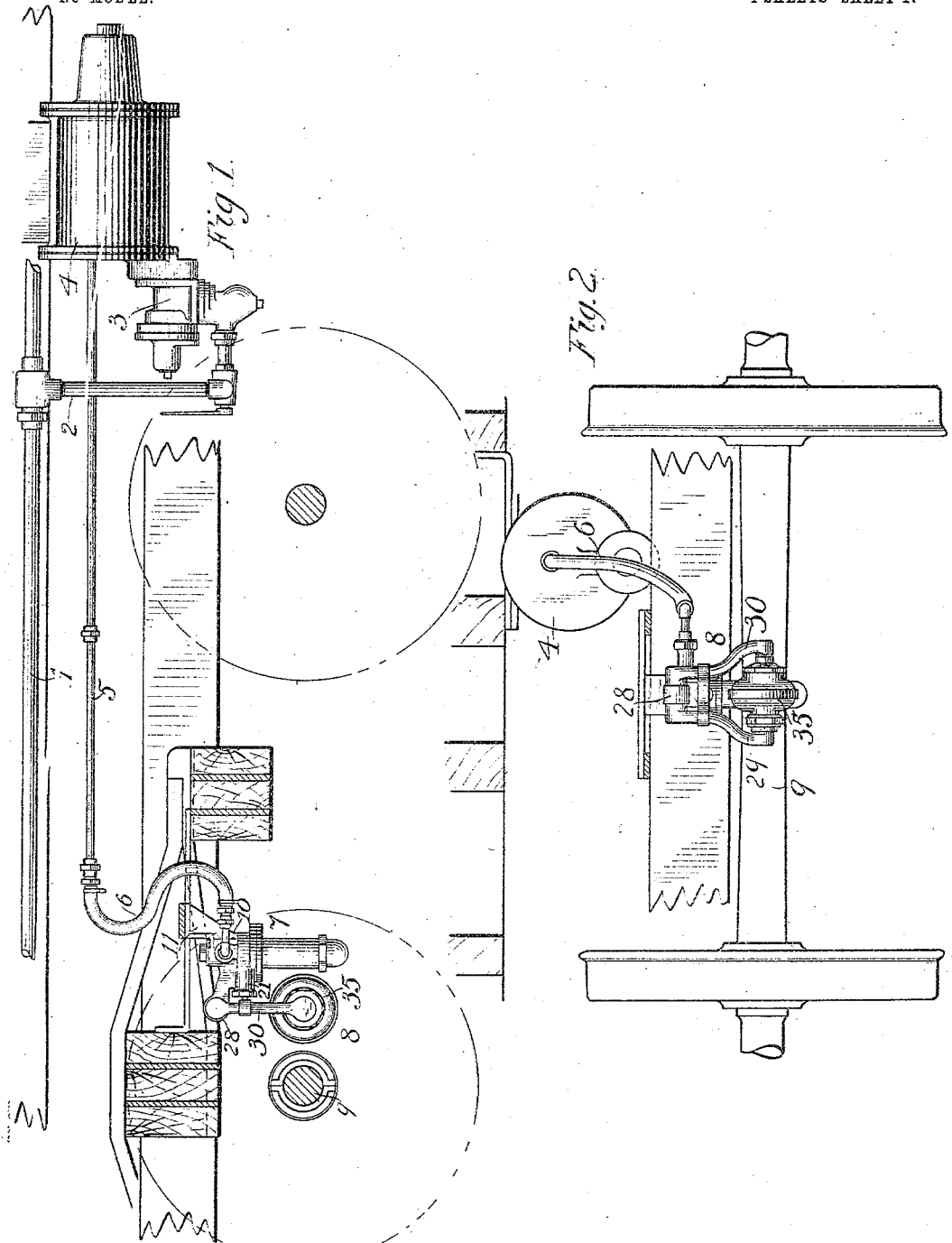
WITNESSES:
Jas. B. MacDonald
INVENTOR,
Edwin M. Herr
By E. Wright
Att'y.

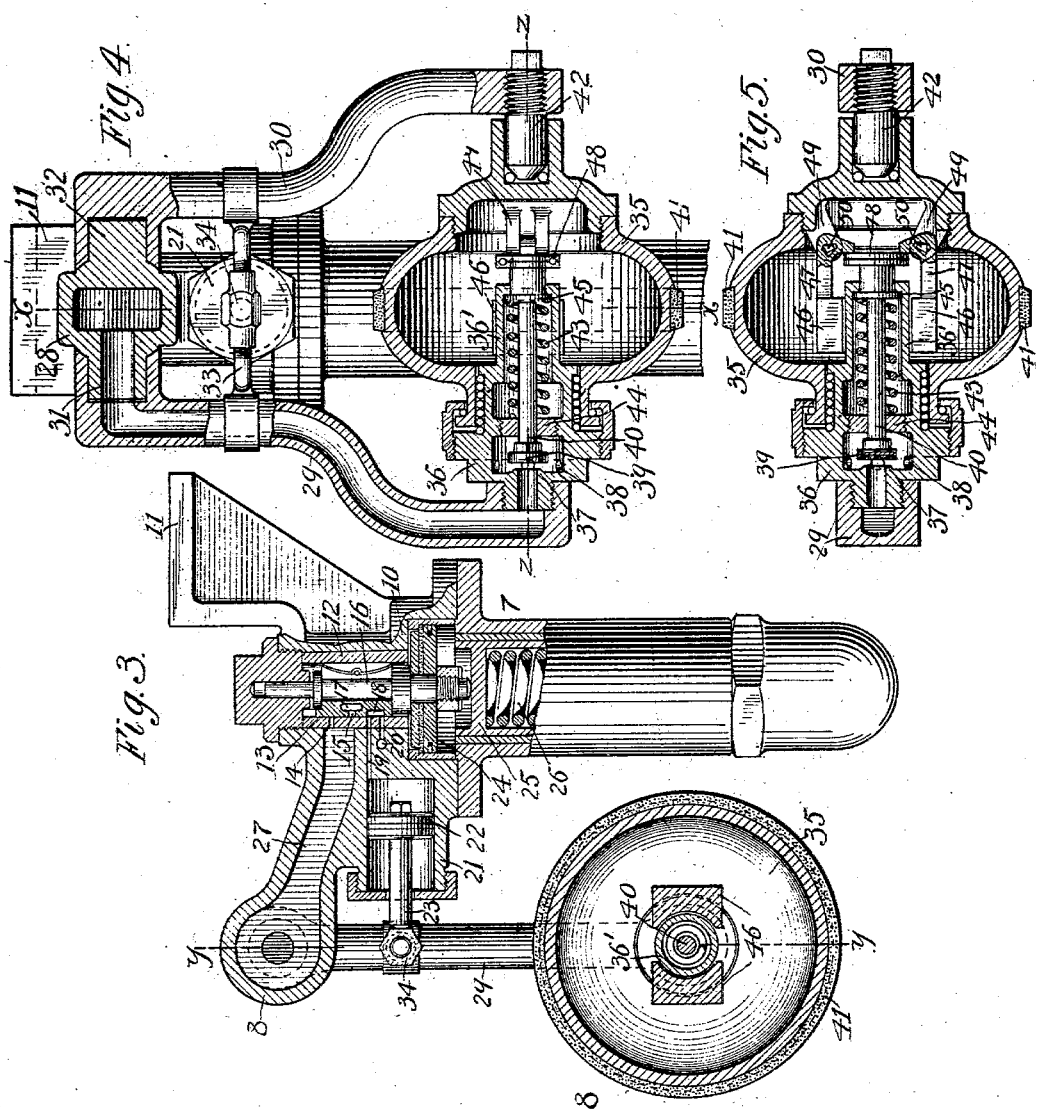

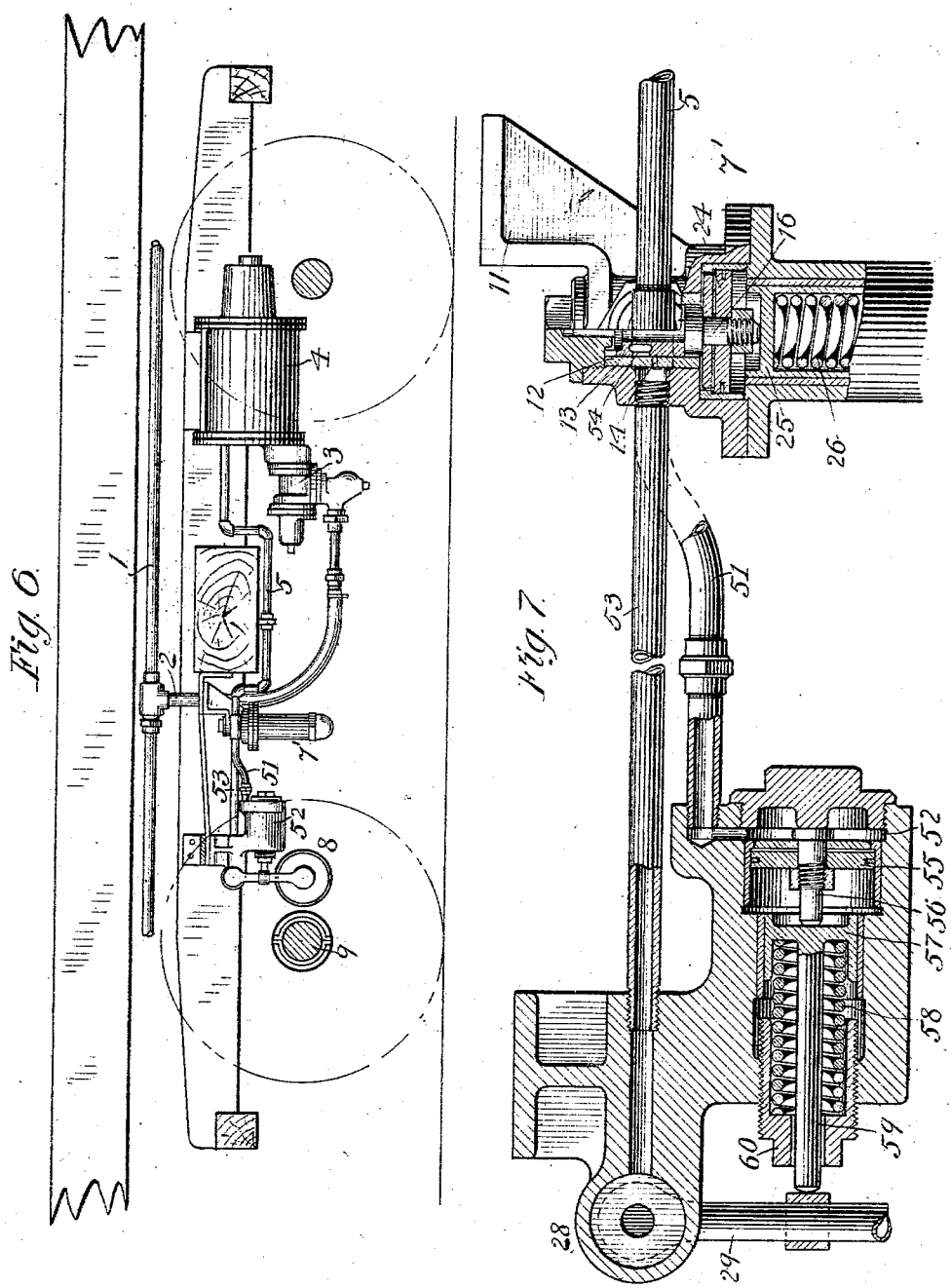

No. 752,071. PATENTED FEB. 16, 1904.
E. M. HERR.
FLUID PRESSURE BRAKE.
APPLICATION FILED MAY 12, 1902.
NO MODEL. 4 SHEETS—SHEET 4.
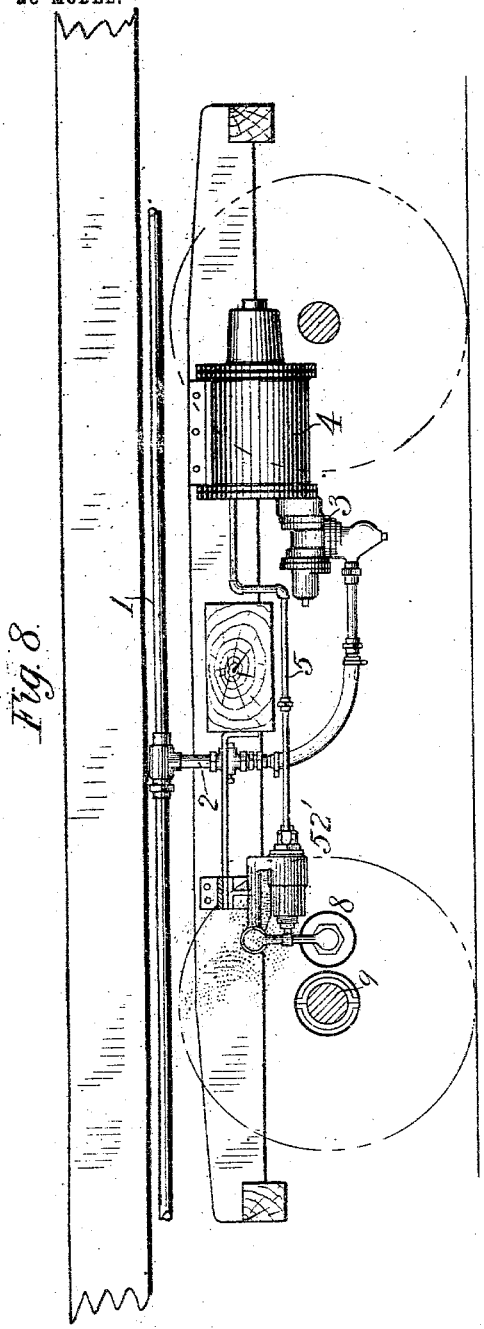
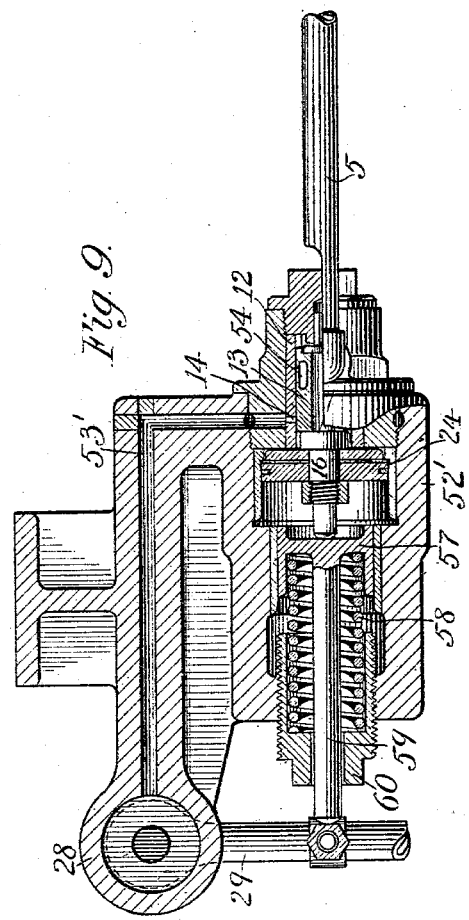
WITNESSES:
Jas. B. MacDonald.
INVENTOR,
Edwin M. Herr
By E. Wright Att'y No. 752,071. Patented February 16, 1904.

UNITED STATES PATENT OFFICE.

EDWIN M. HERR, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 752,071, dated February 16, 1904.

Application filed May 12, 1902. Serial No. 106,892. (No model.)

*To all whom it may concern:*

Be it known that I, EDWIN M. HERR, a citizen of the United States, residing in Pittsburg, county of Allegheny, and State of Pennsylvania, have invented a certain new and useful Improvement in Fluid-Pressure Brakes, of which improvement the following is a specification.

This invention relates to fluid-pressure brakes, and more particularly to what is known as the "high-speed" brake, which is designed to be used on trains that run at exceptionally high speeds. As is well known, the effective resistance caused by the pressure of the brake-shoes upon the wheels varies greatly, according to the speed of the train, being much less at high velocities than at ordinary or slow speeds, so that not only may the brake-shoes be applied with greater force at high speeds without danger of sliding the wheels, but it is found that this increased braking force is absolutely necessary in order to be able to properly control the train and secure the desired checking or stopping of the train within the required distance.

As now used the high-speed brake apparatus comprises the usual form of quick-action brake equipment with governor and feed-valve set to maintain the increased pressure throughout the system and the brake-cylinders having attached thereto the pressure-reducing valves, such as shown and described in Patent No. 506,185 of October 3, 1893, whereby the brake-cylinder pressure is restricted to a predetermined amount in service applications, while in emergency applications it is gradually reduced from emergency pressure to the predetermined amount. The pressure-reducing valves are usually set to open at about sixty pounds per square inch, since in ordinary service applications it is not desirable to have a greater brake-cylinder pressure on account of the danger of sliding the wheels. Also in emergency applications the reducing-valve effects a gradual reduction of the brake-cylinder pressure from maximum to about sixty pounds through a port of gradually-increasing size which is supposed to correspond with the diminishing velocity of the train and secure a maximum braking effect without causing a sliding of the wheels. This has been found to be a very efficient apparatus and has given good satisfaction in practice. It may sometimes happen, however, in emergency applications that for various reasons the speed of the train will not at first be sufficiently checked to warrant the immediate reducing of the brake-cylinder pressure, and in order to secure the maximum braking effect on such occasions the full pressure should be maintained in the brake-cylinder until the velocity of the train is diminished to a certain extent and then be gradually reduced according to the reduction in the speed of the train. Also when running at high speeds it may be desirable to produce a service application of greater pressure than that at which the reducing-valve is set; and the object of my invention is to provide a device by means of which these desired results may be secured.

My invention therefore comprises a speed-controlled valve device coöperating with a reducing-valve or a valve actuated by the brake-cylinder pressure as applied to a brake-cylinder outlet or escape-passage and adapted to hold the outlet-passage closed when the speed of the car is above a predetermined rate and to open said outlet when the speed falls below that rate.

My invention also comprises means whereby the speed-controlled device is automatically set into operation when the brake-cylinder pressure exceeds a certain amount, and it further comprises certain novel combinations and improved features of construction, as hereinafter more fully set forth.

In the accompanying drawings, Figure 1 is a side elevation of a brake apparatus, showing one form of my invention applied thereto, a portion of the car-truck and floor-timbers being indicated in diagram; Fig. 2, an end view of the same; Fig. 3, a vertical section taken on the line $x\ x$ of Fig. 4 and showing the pressure-reducing valve and speed-controlled device on a larger scale; Fig. 4, a transverse section of the speed-controlled device, taken on the line $y\ y$ of Fig. 3; Fig. 5, a horizontal section of the same, taken on the line z z of Fig. 4; Fig. 6, a side elevation showing a modified form of my improvement; Fig. 7, a sectional view of a part of the pressure-reducing valve and the speed-controlled device constructed according to the modification shown in Fig. 6; Fig. 8, a view similar to Fig. 6, but showing still another modification; and Fig. 9, a sectional view showing the pressure-reducing valve and its connection to the speed-controlled device corresponding to the modified arrangement as shown in Fig. 8.

Referring to the form of my invention shown in Sheets 1 and 2 of the drawings, I have indicated an ordinary quick-action brake apparatus of the Westinghouse type, including train-pipe 1, branch pipe 2, triple valve 3, and brake-cylinder 4, it being understood, however, that my invention is not restricted in its use to this particular type of brake apparatus, but may be employed with other fluid-pressure brake systems as well. According to this form of my invention the brake-cylinder is connected by a pipe 5 and flexible pipe 6 with the pressure-reducing valve 7 and speed-controlled device 8. It is preferable to mount the two latter devices upon the car-truck, and when the brake-cylinder is mounted on the car-body, as shown in Figs. 1 and 2, the flexible-pipe connection 6 is necessary in order to allow for the relative movement between the truck and car-body.

The pressure-reducing valve 7, as shown more particularly in Fig. 3, comprises a casing having an upper portion 10, containing the valve and piston chambers, and supported by a bracket 11. A bushing 12 is fitted to the valve-chamber and one side thereof forms a valve-seat for the slide-valve 13, which is connected to the piston 24 by a stem 16. In the lower section of the casing is located the adjustable spring 26, bearing against the movable head 25, which in turn bears against the lower end of the piston-stem 16 and determines the pressure at which the reducing-valve will open, since the pipe 5 from the brake-cylinder is in open communication with the valve-chamber and upper face of the piston 24. A port 14 in the slide-valve seat communicates with passage 27, leading to the hollow head 28, which supports the two opposite trunnions 31 and 32. On these trunnions are mounted the swinging arms 29 and 30, the arm 29 being hollow and communicating with the hollow trunnion 31. This arm 29 carries at its lower end the valve-casing 36, having valve-seat 37 and outlet-openings 38 and containing valve 39, carried by stem 40. An adjustable pin 42 is carried by the solid arm 30, and on this pin and the casing 36 is rotatably mounted the hollow casing 35, ball-bearings being provided to reduce the friction, if desired. The casing 36 is provided with an extension 36', which projects into the chamber 35, and within this extension 36' is located the spring 43, mounted on the valve-stem 40 between the guide 44 and the shoulder 45, which normally rests against the inner end of the said extension of the casing. The centrifugal weights 46, having arms 47, are pivotally mounted on the fulcrum-pins 50, which are carried by the lugs 49 within the hollow casing 35, the ends of said arms 47 extending into engagement with the bearing-plate 48, secured to the valve-stem 40 of the speed-controlled valve 39.

It will be noticed that the angular fulcrum-pins 50 are each provided with two edges adapted to engage corresponding angles of the angular openings in the arms 47, so that as the arms are extended by centrifugal force due to the revolving weights the fulcrum-point will change from one edge of the pin to the other edge when the speed exceeds a predetermined rate. This will change the length of the lever-arm through which the centrifugal force is acting on the bearing-plate 48 and cause a positive and considerable movement of the valve-stem, which will be sufficient to positively close the valve 39 against its seat. This construction comprises a means for suddenly varying the effect of the speed-controlled mechanism upon the governor-valve, whereby the same will be positively opened or closed when the speed passes a predetermined rate. Other means for securing this result may be devised without departing from the spirit of my invention. The object of this construction is to enable the governor to hold the valve closed for all speeds above a certain rate, while for all speeds below this the valve will be open sufficiently wide to allow the desired rate of reduction in the brake-cylinder pressure.

The rotatable chamber 35 is hung in close proximity to one of the car-axles 9 and is adapted to be forced into engagement therewith by means of piston 22 and stem 23, located in cylinder 21. A band 41 of wearing or frictional material—such as rubber, leather, or the like—is secured to the perimeter of the rotatable casing 35 and is adapted to make contact with the axle. According to the construction shown the stem 23 is arranged to bear against the sleeve-nut 34 of the rod 33, which connects the two swinging arms 29 and 30 and by which a tight bearing is secured between said arms and trunnions 31 and 32. The slide-valve 13 has a port 15 connected to a transverse opening 17, communicating with the interior of the slide-valve chamber and also a cavity 18, adapted to normally connect the supply-port 19 and exhaust-port 20 of the cylinder 21. I have shown this pressure-cylinder 21 as carried by the casing 10 of the reducing-valve; but it is obvious that it may be separate therefrom, if desired, and it will also be evident that any other means than that shown may be employed for bringing the rotatable governor-casing 35 into engagement with the car-axle 9 when the brake-cylinder pressure rises above a predetermined amount without departing from my invention.

The operation of this particular form of my improved device is as follows: The spring 26 of the reducing-valve being adjusted to hold a pressure of sixty pounds per square inch or any other desired pressure in the brake-cylinder, the parts will remain inert and in their normal positions, as shown, as long as the brake-cylinder pressure does not exceed sixty pounds. If, however, an emergency application of the brakes should be made or a service application that produces a higher pressure than sixty pounds in the brake-cylinder, the piston 24 will be forced downward, moving the slide-valve so as to uncover the outlet-port 14 and to register port 15 with supply-port 19 of the cylinder 21. In practice the ports are so arranged that port 15 begins to register with port 19 slightly in advance of the opening of port 14, so that the speed-controlled device will be in operation when the port 14 of the reducing-valve opens. Air under pressure from the brake-cylinder will then immediately pass into cylinder 21 and move the piston 22 outward, thus swinging the rotatable governor-casing into engagement with the car-axle, so that the weights will be extended by the centrifugal force, according to the speed of the train. At the same time air under pressure from the brake-cylinder will flow through port 14, passage 27, hollow arm 29 to the valve 39, and if the speed of the train is below the predetermined rate this valve 39 will be open, so as to allow a reduction in the brake-cylinder pressure to sixty pounds, at which pressure the slide-valve moves up and closes the outlet-port 14 and also releases the air from cylinder 21 through port 19, exhaust-cavity 18, and exhaust-port 20. The speed-controlled device then swings away from engagement with the car-axle and ceases rotating. If at the time of an emergency application or an excessive service application the speed of the train should be above the predetermined rate, the centrifugal force of the weights, due to the excessive speed of the train, will extend the arms 47 sufficiently to shift the fulcrum-points on the pins 50 and close the valve 39. This will prevent any discharge from the brake-cylinder through the reducing-valve until the speed is checked and the centrifugal force of the weights reduced sufficiently to allow the valve 39 to open. Then the extra pressure in the brake-cylinder above sixty pounds will be relieved, and the parts will return to their normal positions, as before described. It will thus be seen that by means of this construction a maximum braking effect is always secured at high speeds, while at lower speeds the brake-cylinder pressure is automatically reduced and injurious sliding of the wheels prevented.

According to the arrangements shown in Figs. 6 and 7 of the drawings the brake-cylinder is mounted on the truck and the triple-valve 3 has a flexible connection with the branch pipe 2 of the train-pipe 1. In this modified form of my invention the release-pipe 5 leads from the brake-cylinder to the reducing-valve 7' and has a branch pipe 51 connected to the cylinder 52, having piston 55, with its stem 56, bearing against the head 57 and adjustable-spring 58. The stem 59 extends out through the adjustable-nut 60 and is adapted to engage the cross-rod connecting the two swinging arms 29 and 30 of the speed-controlled device 8 and force the rotatable casing 35 into engagement with the car-axle when the brake-cylinder pressure exerted upon the piston 55 exceeds the opposing force of the adjustable-spring 58. The reducing-valve device 7' is substantially similar to that shown in Fig. 3, with the exception that the slide-valve 13 is provided with a port 54, adapted to register with the outlet-port 14 in the valve-seat when the brake-cylinder pressure exceeds that for which the spring 26 is adjusted, the ports 15 and cavity 18 for supplying and releasing fluid to the pressure-cylinder 21 also being dispensed with, according to this latter modification. The port 14 communicates with pipe 53, which leads to the hollow head 28 and arm 29 of the speed-controlled device 8. In this form of my device it will be noticed that both pistons 24 and 55 are constantly exposed to the brake-cylinder pressure and that the parts will remain inert and in their normal positions, as shown, until the brake-cylinder pressure exceeds sixty pounds or any other pressure to which the springs 26 and 58 may be adjusted. In practice the spring 58 is usually adjusted to a pressure slightly below that of spring 26, so that when the pressure-reducing valve moves down and opens the outlet-port 14 the speed-controlled device will be in operation with its valve either opened or closed, according as the speed of the train is below or above the predetermined rate.

The modification shown in Figs. 8 and 9 is similar to that shown in Figs. 6 and 7, with the exception that the two-pressure devices are combined into one, the slide-valve 13, with its stem 16, piston 24, and bushing 12 being located in the casing 52' and adapted to actuate the swinging arms 29 and 30 directly through the stem 59. According to this construction the piston 55, as shown in Fig. 7, is dispensed with, and the pipe 5 from the brake-cylinder is connected directly to the valve-casing, while the port 14 communicates with the pipe or passage 53', leading to the hollow head 28 and arm 29 of the speed-controlled device 8. The operation of this form of my improvement will be readily understood from the drawings and the foregoing description.

Various means may be used for setting the speed-controlled device into operation, and other forms of speed-controlled valve devices may be designed, all of which are included within the scope of my invention.

Having now described my invention, what I claim as new, and desire to secure by Letters Patent, is—

1. In a fluid-pressure brake, the combination with a brake-cylinder having an outlet-passage and a pressure-reducing valve controlling said passage, of a separate speed-controlled valve device for governing the outlet from the brake-cylinder through the reducing-valve and adapted to normally hold said passage open at ordinary speeds.

2. In a fluid-pressure brake, the combination with a brake-cylinder having an outlet port or passage, of a pressure-reducing valve controlling said port, and a separate speed-controlled device for normally opening the outlet from the reducing-valve at ordinary speeds and for closing said outlet when the speed of the train is excessive.

3. In a fluid-pressure brake, the combination with a brake-cylinder having an outlet port or passage, of a valve actuated by the brake-cylinder pressure for controlling said passage, and an independent speed-controlled valve device for governing said outlet-passage and normally holding the same open at ordinary speeds.

4. In a fluid-pressure brake, the combination with a brake-cylinder having an outlet-passage, of a valve actuated by the brake-cylinder pressure for controlling said passage, a normally open governor-valve also controlling said passage, and speed-controlled means driven from the car-axle for closing the governor-valve at high rates of speed.

5. In a fluid-pressure brake, the combination of a brake-cylinder having an outlet-passage, a valve actuated by the brake-cylinder pressure for controlling said outlet-passage, a normally open governor-valve also controlling said passage, and a centrifugal speed-governor driven from the car-axle for closing the governor-valve at high rates of speed.

6. In a fluid-pressure brake, the combination with a brake-cylinder having an outlet-passage, of a valve actuated by the brake-cylinder pressure for controlling said passage, a speed-controlled valve device for also governing said passage, and means actuated by the brake-cylinder pressure for throwing the speed-controlled device into operation when the pressure rises to predetermined amount.

7. In a fluid-pressure brake, the combination with a brake-cylinder having an outlet-passage, of a valve actuated by an excessive degree of cylinder-pressure to open said passage, a governor-valve, a speed-controlled mechanism therefor driven from the car-axle but normally out of engagement therewith, and means actuated by an excessive degree of cylinder-pressure for forcing said mechanism into engagement with the car-axle.

8. In a fluid-pressure brake, the combination with a brake-cylinder having an outlet, of a governor-valve for controlling said outlet, a speed-controlled mechanism for said valve, and means for throwing said mechanism into operation only when the cylinder-pressure is excessive, or rises above a predetermined degree.

9. In a fluid-pressure brake, the combination with a brake-cylinder having an outlet, of a governor-valve controlling said outlet, a speed-controlled mechanism therefor adapted to be driven from the car-axle, and means actuated only by an excessive degree of brake-cylinder pressure for forcing said mechanism into engagement with the car-axle.

10. In a fluid-pressure brake, the combination of a brake-cylinder having an outlet-passage, a speed-controlled valve device for governing said passage, a piston for throwing said device into operation, a valve for supplying fluid under pressure to said piston, and a movable abutment actuated by the brake-cylinder pressure for opening said valve.

11. In a fluid-pressure brake, the combination of a brake-cylinder having an outlet or escape passage, a governor-valve for controlling said passage, a speed-controlled device for continuously acting upon said valve, and means for suddenly varying the effect of the speed-controlled device upon the valve when the speed passes a predetermined rate.

12. In a fluid-pressure brake, the combination of a brake-cylinder having an outlet or escape passage, a governor-valve for controlling said passage, centrifugal governor-weights for operating said valve and adapted to be driven from the car-axle, and pivoted arms having double fulcrums whereby the valve may be positively closed when the speed exceeds a predetermined rate.

13. In a fluid-pressure brake, the combination of a brake-cylinder having an outlet-passage, a valve actuated by the brake-cylinder pressure for controlling said passage, a governor-valve for also controlling said passage, a speed-controlled device driven from the car-axle for continuously acting upon said governor-valve, and means for suddenly varying the effect of said device upon the governor-valve when the speed passes a predetermined rate.

In testimony whereof I have hereunto set my hand.

EDWIN M. HERR

Witnesses:
JOHN F. MILLER,
F. P. LIVINGSTON.